United States Patent
Hedström et al.

(10) Patent No.: US 7,320,760 B2
(45) Date of Patent: Jan. 22, 2008

(54) CLEANING EFFICIENCY TESTING METHOD AND APPARATUS FOR A FILTER IN A FILTERING SYSTEM

(75) Inventors: Stefan Hedström, Helsingborg (SE); Harald Hermansson, Lund (SE); Jeanette Lindau, Södra Sandby (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 18 days.

(21) Appl. No.: 10/496,672

(22) PCT Filed: Nov. 26, 2002

(86) PCT No.: PCT/SE02/02162

§ 371 (c)(1),
(2), (4) Date: May 26, 2004

(87) PCT Pub. No.: WO03/045530

PCT Pub. Date: Jun. 5, 2003

(65) Prior Publication Data
US 2005/0000894 A1   Jan. 6, 2005

(30) Foreign Application Priority Data
Nov. 30, 2001  (SE) .................................... 0104020

(51) Int. Cl.
*B01D 41/00* (2006.01)

(52) U.S. Cl. ............ 210/741; 210/791; 210/108; 210/143; 73/38; 73/40

(58) Field of Classification Search ............... 210/741, 210/791, 797, 805, 108, 143, 408; 73/38, 73/40
See application file for complete search history.

(56) References Cited

U.S. PATENT DOCUMENTS

| 4,332,679 | A | | 6/1982 | Hengst et al. |
| 4,774,002 | A | | 9/1988 | Gutman et al. |
| 4,876,100 | A | | 10/1989 | Holm et al. |
| 4,921,610 | A | * | 5/1990 | Ford et al. ................. 210/636 |

(Continued)

FOREIGN PATENT DOCUMENTS

DE   38 36 530 A1   5/1990

(Continued)

OTHER PUBLICATIONS

Brantley et al., "Integrity Testing of Sterlizing Grade Filters," Pall Ultrafine Filtration Company, 1997.

(Continued)

*Primary Examiner*—Robert A. Hopkins
(74) *Attorney, Agent, or Firm*—Birch, Stewart, Kolasch & Birch, LLP

(57) ABSTRACT

A method and an apparatus are provided for testing the efficiency of a cleaning procedure for a filter in a filtering system. After the cleaning procedure of the filter, the filter pores contain a fluid. The system is pressurized, and a decay in pressure over a predetermined time period is measured. Based on the pressure decay, it is determined whether or not the cleaning procedure has been effective; a pressure decay smaller than a predetermined threshold value indicates that the cleaning procedure has not been effective.

14 Claims, 4 Drawing Sheets

U.S. PATENT DOCUMENTS 5,256,437 A    10/1993   Degen et al.
5,783,245 A *   7/1998   Simpson, II ................ 426/580

FOREIGN PATENT DOCUMENTS

| JP | 56-45154 A    | 4/1981  |
| JP | 3-77630 A     | 4/1991  |
| JP | 6-276932 A    | 10/1994 |
| JP | 2001-120966 A | 5/2001  |
| WO | WO-98/41102   | 9/1998  |
| WO | WO98/57549 A1 | 12/1998 |

OTHER PUBLICATIONS

"Validation Guide for the 'Paltronic' FFE04 Filter Integrity Test Instrument," Pall Process Filtration Limited, England.
Ramstorp et al., "Integritetstestning Av Sterilfilter, " Colly Company AB, 1989, pp. 15-18.
Brantley et al., "Integrity Testing of Sterlizing Grade Filters, " Pall Ultrafine Filtration Company, 1997.
Ramstorp et al., "Integritetstestning Av Sterilfilter, " Colly Company AB, 1989, pp. 15-18.

* cited by examiner

CLEANING EFFICIENCY TESTING METHOD AND APPARATUS FOR A FILTER IN A FILTERING SYSTEM

TECHNICAL FIELD OF THE INVENTION

The present invention relates to a method and an apparatus for testing the efficiency of a cleaning procedure for a filter in a filtering system.

BACKGROUND ART

Sterile milk can be defined as milk free of micro-organisms which can grow under prevailing storing conditions. Microfiltration is one of a number of methods used for producing sterile milk. WO 98/57549 and U.S. Pat. No. 5,256,437 describe methods for the production of sterile milk using microfiltration. According to these methods, the milk is passed through a filter through which only particles smaller than a certain size can pass. This means that e.g. harmful microorganisms are filtered out. Filters used in microfiltration processes are often made of ceramic material.

During the production of sterile milk in this manner, the filter needs to be cleaned after a certain amount of time. As a rule, the system does not enter a cleaning phase in the midst of a production cycle; this only happens if the pressure that is required to maintain a constant flow through the filter exceeds a certain threshold value. This pressure increases gradually during a production cycle, as the filter pores become more and more fouled (i.e. clogged with particles filtered out from the milk).

The cleaning procedure is commonly called CIP (Cleaning In Place) and is performed by flushing the system with water with added detergents. A problem that sometimes occurs is that this cleaning fails; the cause of this might for example be a failure in the opening of a valve somewhere in the system. When the filters have not been completely cleaned before a production cycle starts, the cycle is shortened, since the above-mentioned pressure rises too fast. This leads to product losses, since the system has to enter the cleaning phase sooner than calculated.

To avoid this it would be desirable to have some way of testing whether or not the cleaning has been successful, before entering into a production cycle.

SUMMARY OF THE INVENTION

The object of the invention is to provide a solution to the previously described problems. This object is obtained by a method for testing the efficiency of a cleaning procedure for a filter in a filtering system, wherein the filter is provided with pores, comprising the steps of performing the cleaning procedure for the filter, wetting the filter, pressurizing the filtering system, measuring a pressure decay in the filtering system over a predetermined time period, and determining, based on the pressure decay, whether or not the cleaning procedure has been effective, wherein a pressure decay smaller than a predetermined threshold value indicates that the cleaning procedure has not been effective.

In a preferred embodiment, the filter is included in a system for producing sterilized milk, preferably skim milk, and the cleaning procedure is a Cleaning In Place (CIP) procedure, where the filter is cleaned with a fluid. At the end of the cleaning procedure, the fluid is drained from the filtering system, leaving the filter pores soaked with the fluid. The fluid is preferably but not necessarily water.

Advantageously, in case the cleaning procedure is found to be non-efficient, an additional cleaning procedure is performed for the filter.

The above object is also obtained by an apparatus for testing the efficiency of a cleaning procedure for a filtering system, which includes a filter with pores. The apparatus comprises filter pressurizing means, a pressure sensor positioned to measure a pressure in the filtering system, and a controller which is operatively coupled to the filter pressurizing means and the pressure sensor. After the filtering system has been subjected to the cleaning procedure, the controller actuates the filter pressurizing means so as to establish a pressure over the filter, monitors an output from the pressure sensor so as to determine a decay in the pressure over the filter during a predetermined time, and estimates a qualitative result of the cleaning procedure by comparing the determined pressure decay to predefined reference data.

Advantageously, the filter pressurizing means comprise a gas supplying device coupled to the filter, and first and second valves positioned at an inlet side and an outlet side, respectively, of the filter, wherein the pressure sensor is positioned between these valves and wherein the controller is adapted to cause the gas supplying device to supply gas to the filter as well as to close the first and second valves so as to establish the pressure over the filter.

Moreover, the qualitative result estimated by the controller preferably indicates whether the cleaning procedure has been efficient or not. In the latter case, the controller may be adapted to initiate an additional cleaning procedure for the filtering system.

The method and apparatus according to the invention give the advantage of reducing the amount of production disturbances, since the risk of having to interrupt a production cycle prematurely is considerably reduced thanks to the invention. In turn, a more cost-efficient production is achieved.

Further scope of the applicability of the present invention will become apparent from the detailed description given hereinafter, However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and in which.

DETAILED DESCRIPTION OF A PREFERRED EMBODIMENT

Figure 1:
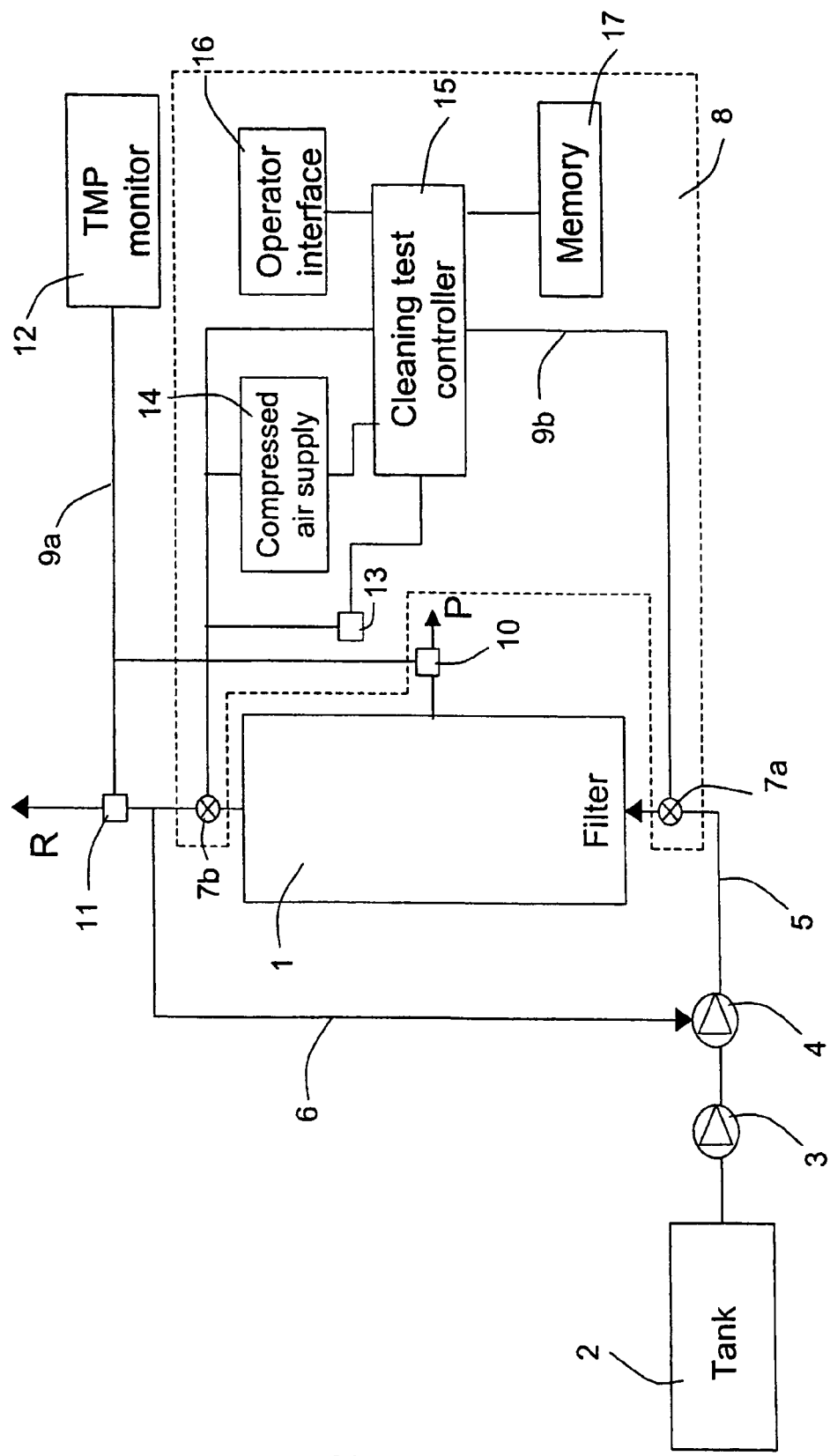
FIG. 1 is a schematic view of a filtering system including an apparatus according to the invention.

The filtering system in FIG. 1 includes a filter 1, a tank 2, a feed pump 3 and a circulation pump 4. On the pipes 5, 6 leading to and from the filter 1 there are two valves 7a, 7b. A test equipment 8, which will be described in more detail later, is connected to the system, as seen at 9a, 9b. Fluid from the tank 2 which enters the filter 1 through the pipe 5 is divided into two fractions when passing the filter, one being discharged at P and one at R. There are two pressure sensors 10, 11 in the system, one at each side of the filter.

The filtering system of FIG. 1 is particularly suited for the processing of skim milk; however other milk types are also possible.

When the system is used for sterilizing milk, the tank 2 contains milk, which by means of the feed pump 3 is fed to the filter 1 through the pipe 5. The fraction of the milk which only contains particles small enough to pass through the filter 1 is discharged for possible further processing at P. This fraction is called permeate. Another fraction is discharged at R, whereas the rest is recirculated through the pipe 6 for further processing through the filter 1. The fraction of the milk that is discharged at R is called retentate. The circulation pump 4 facilitates the recirculation of milk through the filter 1.

The pressure at P is measured by the pressure sensor 10, and the pressure at R is measured by the pressure sensor 11. The pressure over the filter—which is called TMP (Trans Membrane Pressure)—is calculated as the difference between these two by a TMP monitor 12. The TMP should not exceed a certain threshold value during a production cycle. If this value is exceeded it is an indication that the filter pores are too clogged, wherein the production cycle will be interrupted by the TMP monitor 12. Consequently, the remaining milk in the tank 2 cannot be processed during this cycle.

The system is cleaned using a CIP (Cleaning In Place) procedure. When the system is in a cleaning phase, the tank 2 is filled with a suitable cleaning fluid. The cleaning fluid is passed through the system in the same way as the milk, hence performing a cleaning procedure for the system and in particular removing the foulants in the filter pores. In the preferred embodiment, the cleaning procedure involves the following steps:

Initially, the system is flushed with water so as to remove any residual milk.

Then, the system is cleaned with a basic fluid, such as sodium hydroxide or potassium hydroxide, possibly with the addition of tensides. Subsequently, water again flushes the system.

After this, the system is flushed with an acidic fluid, such as nitric acid. Finally, water is used to rinse the system.

However, the cleaning procedure itself forms no central part of the invention and may be performed in other ways than above.

Figure 2:
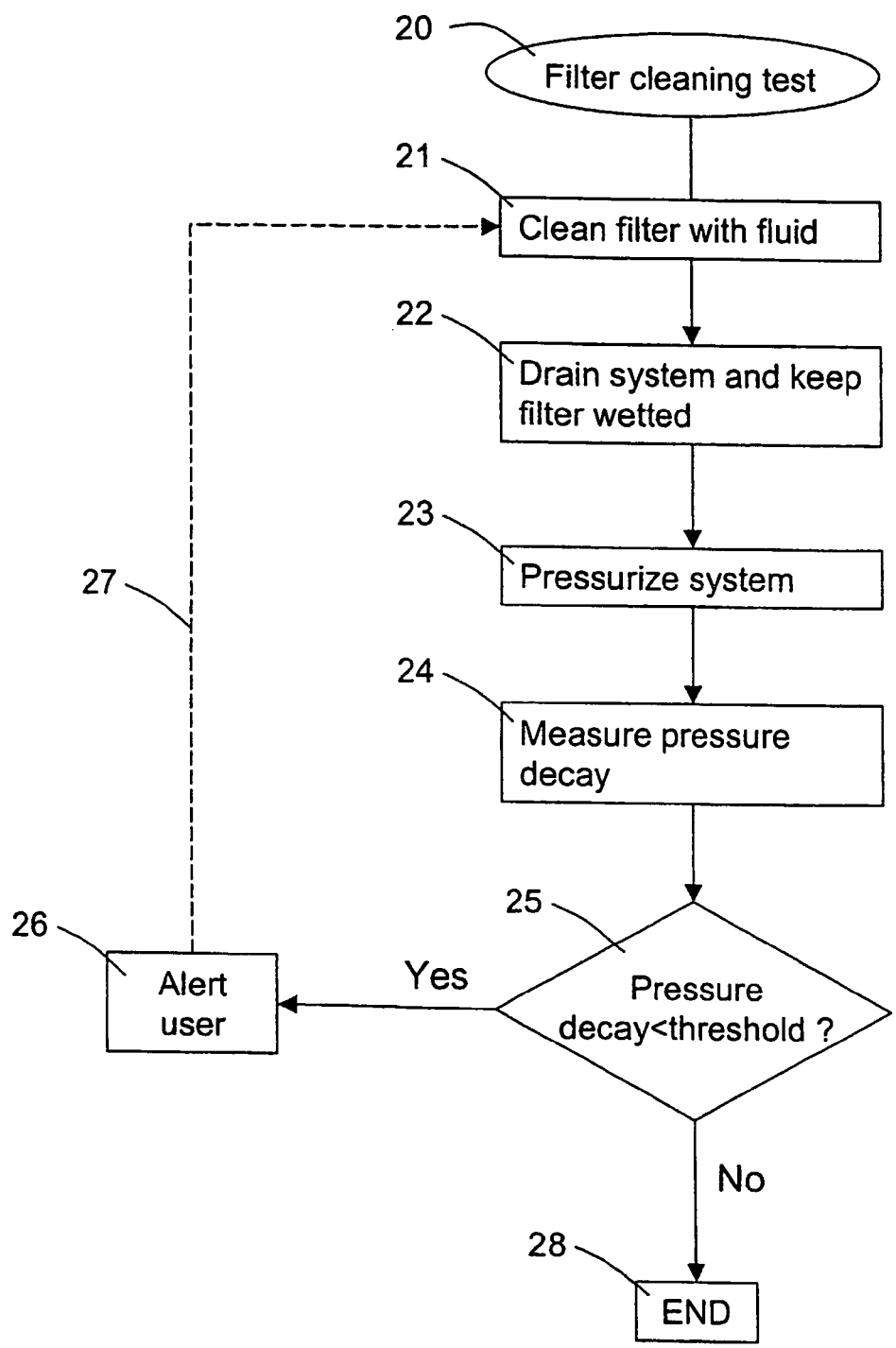
FIG. 2 is a flow chart illustrating the method of the invention.

After the cleaning phase, the filter 1 is tested by the test equipment 8 of FIG. 1 in accordance with the method presented in FIG. 2. The test equipment 8 includes a supply of gas 14, preferably a compressed air supply, which is connected to the retentate side R of the filter 1. A pressure sensor 13 is positioned to measure the pressure at aforesaid retentate side R. A controller 15 is operatively coupled not only to the compressed air supply 14 and the pressure sensor 13 but also to a first valve 7a at the inlet side of the filter 1 as well as to a second valve 7b at the retentate side. The controller 15 has an optional operator interface 16, including e.g. a CRT or LCD monitor, a set of indicator lamps or LEDs, a printer or plotter, a keyboard, a mouse, a joystick, etc.

The controller 15 also has a memory 17, such as a read/write memory (RAM, SRAM, etc), a read-only memory (ROM, PROM, EPROM, EEPROM), a permanent storage (magnetic or optical disk, etc), or any combination thereof. The controller itself may conveniently be implemented by any commercially available microprocessor (CPU), or another programmable logic device such as a FPGA, together with program code stored in the memory 17. The controller 15 may alternatively be realized as an integrated circuit, as discrete logic gates together with other analog and digital components, or in any combination of the above.

With reference to FIG. 2, a filter cleaning test method 20 according to the preferred embodiment starts with the actual cleaning procedure 21, during which the filtering system, including the filter 1, is cleaned with fluid from the tank 2 and, ultimately, flushed with water. In a subsequent step 22 the water is drained from the filtering system, leaving the pores of the filter 1 soaked with water. Then, in step 23, the controller 15 causes the compressed air supply 14 to supply air through pipes 9a, 9b to the filter 1. Moreover, the controller 15 actuates the two valves 7a, 7b to assume their closed states, wherein the filter 1 is sealed from the rest of the system and, consequently, is pressurized. An exemplary filter type may for instance be pressurized to about 1600 mbar; this value may however vary widely between different applications and, in particular, different filter types.

Over time, air will diffuse through the filter pores, and the pressure will drop accordingly. If the pores are clogged due to insufficient cleaning, there will only be a very small decay, since the diffusion of air through the filter pores will be reduced. Consequently, this is an indication that the filter has not been cleaned properly. Thus, a pressure decay measuring step 24 is initiated by resetting an internal timer in the controller 15. An initial pressure value is obtained as a momentary output from the pressure sensor 13. Once the timer indicates that a predetermined time period has lapsed—the value of this predetermined time period may conveniently be stored in the memory 17 and may, for instance, be 120 seconds—the controller 15 again reads a momentary output value from the pressure sensor 13. The pressure decay is then calculated in the controller 15 as the difference between the two momentary output values from the pressure sensor 13.

In a step 25 the calculated pressure decay is compared to a predetermined threshold value, which too may be stored in the memory 17. If the calculated pressure decay is larger than (or, theoretically, equal to) the predetermined threshold value, the controller 15 considers the decay to be normal and indicative of an efficient cleaning procedure 21. The execution continues to a final step 28, where the remaining air is vented from the filtering system by opening the valves 7a, 7b and a new production cycle may commence. On the other hand, if the calculated pressure decay is in fact less than the predetermined threshold value, a step 26 follows in which an operator may be alerted of the failed or at least insufficient cleaning procedure 21 through the operator interface 16. The operator will then be able to repeat the cleaning of the filter 1, as indicated at 27 in FIG. 2. Alternatively, an additional cleaning procedure 27 may be automatically initiated by the controller 15.

The additional cleaning procedure 27 may be performed in different ways. In the preferred embodiment the additional cleaning procedure 27 is realized by repeating the normal Cleaning In Place (CIP) procedure 21 in its entirety.

Alternatively, however, the additional cleaning procedure 27 may involve the same steps as the normal CIP procedure 21 but with either a shorter or a longer duration.

As a further alternative, only some of the steps of CIP 21 are performed during the additional cleaning procedure 27.

According to yet another alternative, the concentration of the acidic cleaning fluid and the basic cleaning fluid, respectively, are either higher or lower during the additional cleaning procedure 27 compared to the normal CIP 21.

Still another alternative is to perform an extra step during the additional cleaning procedure 27, for instance involving the use of an enzymatic cleaning fluid.

The test equipment 8 may advantageously be implemented by a commercially available integrity test equipment, such as PALLTRONIC FFE04 from Pall Process Filtration Limited, Europa House, Havant Street, Portsmouth PO1 3PD, England. Hitherto, such integrity test equipment has been used solely to verify that the filter element is intact, i.e. that there are no cracks or other defects in the filter that would allow large particles to pass through the filter which would in turn lead to a non-sterile product. In contrast, the present invention may advantageously make novel use of such equipment to test not for filter integrity but for filter cleaning efficiency. It is emphasized that the test equipment 8 may be realized by other means than aforesaid integrity test equipment.

Figure 3:
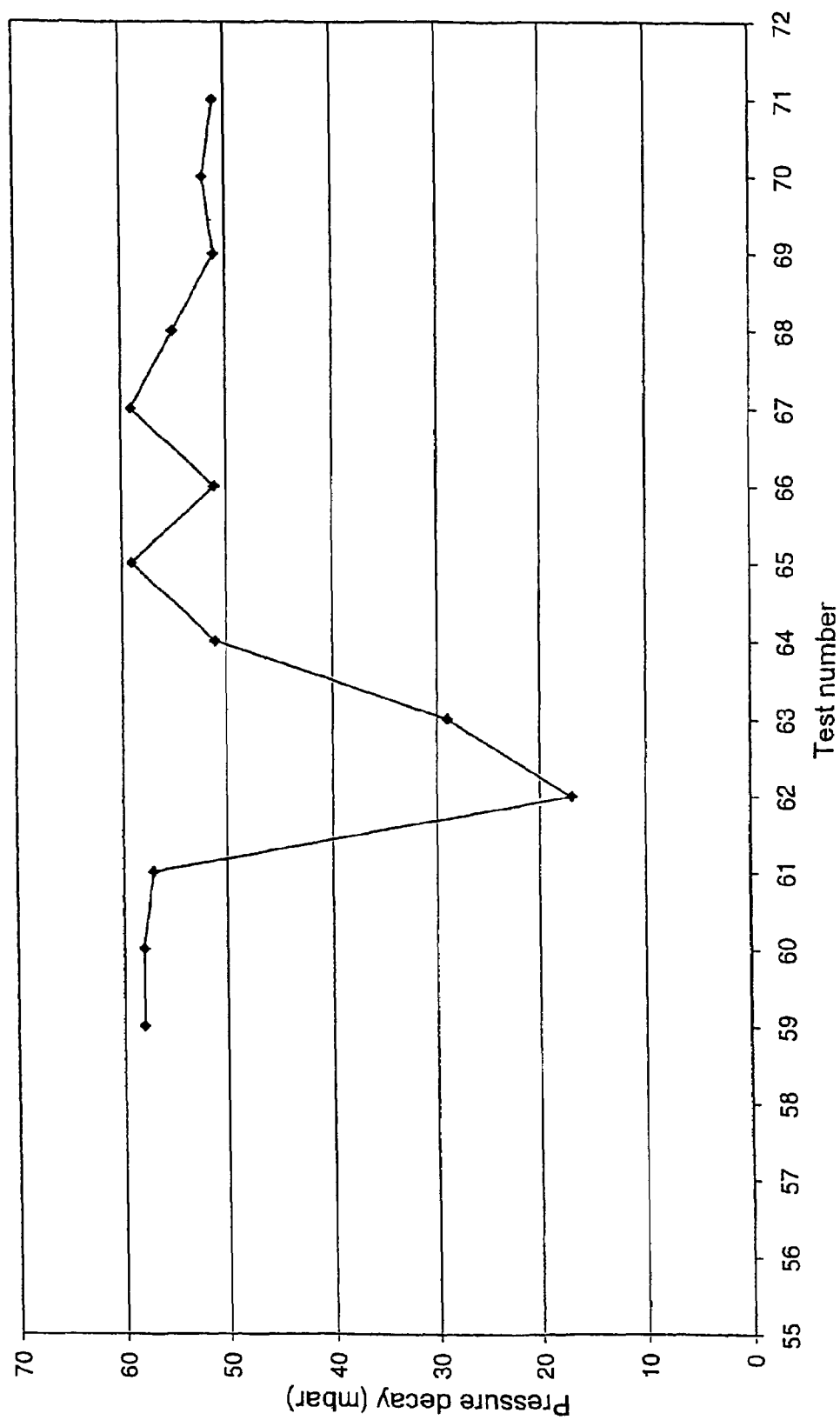
FIGS. 3 and 4 are diagrams of test results obtained during use of the invention in a filtering system.

FIG. 3 shows an example of how the pressure decay varies in a certain filtering system. The system was in each test case 59–71 subjected to a cleaning procedure after a production cycle. Then the system was pressurized to about 1600 mbar, and the pressure decay over 120 seconds was measured. In most of the cases, the pressure decay was about 50–60 mbar, but in the test cases 62 and 63, the pressure decay was much lower; 10–30 mbar. These two tests were performed after insufficient cleaning of the filter.

An improvement of the embodiment shown in FIGS. 1–3 will now be described with reference to FIG. 4, which illustrates a long-term variation in the pressure decay measured during step 24 of the filter cleaning test procedure 20 in the normal situation (i.e. when the filter cleaning is deemed to have been efficient, cf. step 28 in FIG. 2).

Figure 4:
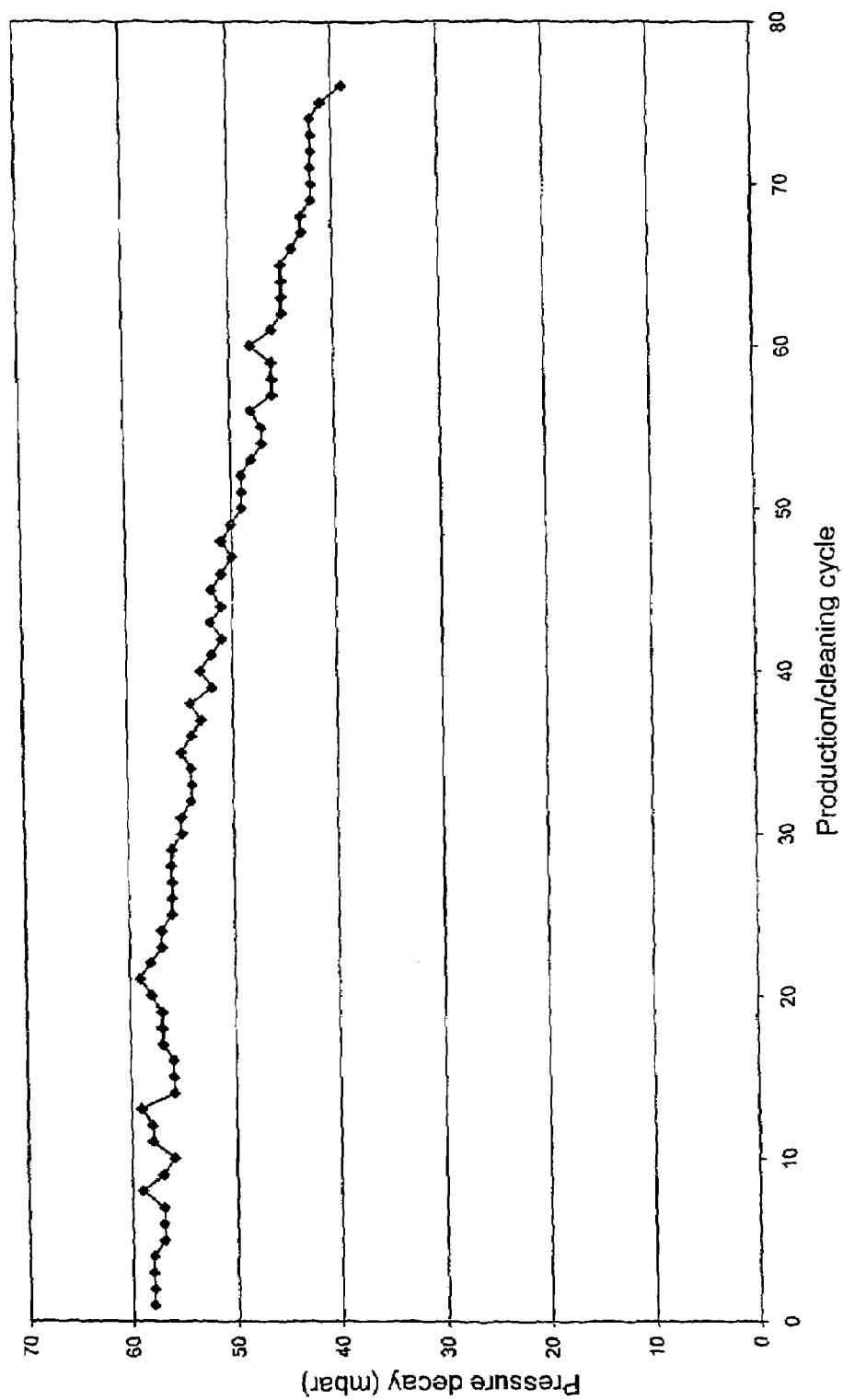

The diagram of FIG. 4 illustrates a series of pressure decay sample values as measured for a particular filtering system in step 24 of FIG. 2 during a large number of production/cleaning cycles. As appears from FIG. 4, following installation of the filter 1 (FIG. 1) in the system, the pressure decay measured in step 24 of FIG. 2 is more or less constant (at about 58 mbar) during the first few production/cleaning cycles. Then, at a slowly decreasing rate, the respective pressure decay values measured in step 24 start to fluctuate throughout the production/cleaning cycles. Eventually, after a large number of production/cleaning cycles (e.g. at about cycle No. 75 in FIG. 4), the normal pressure decay value measured in step 24 of FIG. 2 amounts to only about 40 mbar, i.e. considerably lower than the initial value slightly below 60 mbar as measured during the first couple of cycles. This long-term shift in normal pressure decay value is predominantly due to the fact that no cleaning procedure will be absolutely perfect in reality (implying that insignificant amounts of milk residuals will remain in the filter 1 and, cumulatively, affect the normal pressure decay value measured in step 24 of FIG. 2).

To handle the above situation and avoid confusing the long-term decrease in normal pressure decay with an abnormal pressure decay like tests No. 62 and 63 in FIG. 3 (indicative of a failed cleaning procedure), the cleaning test controller 15 is adapted to perform a series of calibration pressure decay measurements when the filter 1 is initially installed in the filtering system. A reference value for normal pressure decay is produced from this series of calibration measurements and is stored in memory 17. Moreover, a second reference value is calculated from the first reference value and is also stored in memory 17, indicative of a limit below which the long-term decrease in normal pressure decay is regarded to be unacceptable in terms of risk of confusion with an abnormal pressure decay.

For instance, in the example of FIG. 4, the second reference value may be set to 40 mbar, meaning that the cleaning test controller 15, at production/cleaning cycle No. 75, will notice that the pressure decay measured in step 24 of FIG. 2 is now below the acceptable limit as defined by the second reference value and, thus, calls for action. Such an action may for instance be that the cleaning test controller 15 commands an additional cleaning procedure, in analogy with steps 26 and 27 of FIG. 2, as has been described above. Such an additional cleaning procedure will bring the normal pressure decay value back to the first reference value (i.e. the initial pressure decay value calculated from the calibration measurements), or to a value which is close to this first reference value. In other words, the reference value for normal pressure decay, as tested in step 25 of FIG. 2, is reset to its initial value as determined upon installation of the filter 1 in the filtering system. As an alternative, the cleaning test controller 15 may perform a new set of calibration measurements in addition to, or instead of, the additional cleaning procedure so as to compensate for the long-term effect described above.

The invention has mainly been described above with reference to a preferred embodiment. However, other embodiments than the one disclosed above are equally possible within the scope of the invention, as defined by the appended patent claims. In particular, the exact values of the pressurization of the filter 1, the pressure decay measurement time and the pressure decay threshold value(s) will have to be tuned to an actual application environment, as is readily realized by a skilled person.

The invention claimed is:

1. A method for testing the efficiency of a cleaning procedure for a filter in a filtering system, said filter being provided with pores, comprising the steps of:
   performing said cleaning procedure for said filter,
   wetting said filter,
   pressurizing the filtering system,
   measuring a pressure decay in said filtering system over a predetermined time period, and
   determining, based on the pressure decay, whether or not the cleaning procedure has been effective, wherein a pressure decay smaller than a predetermined threshold value indicates that the cleaning procedure has not been effective.

2. The method as in claim 1, wherein said cleaning procedure involves use of a fluid in said filtering system and wherein the step of wetting said filter is performed, upon completion of said cleaning procedure, by draining said fluid from said filtering system, while leaving the pores of said filter soaked with said fluid.

3. The method according to claim 1 or 2, wherein said fluid contains water.

4. The method according to claim 1 or 2, wherein said cleaning procedure is a Cleaning In Place (CIP) procedure.

5. The method according to claim 1 or 2, wherein the filter is used in a system for producing sterilized milk.

6. The method according to claim 1 or 2, comprising the further step of performing an additional cleaning procedure for said filter, in case aforesaid cleaning procedure was determined as not having been efficient.

7. An apparatus for testing the efficiency of a cleaning procedure for a filtering system, said filtering system including a filter with pores, comprising:
- means for performing a cleaning procedure for said filter;
- means for wetting the filter;
- filter pressurizing means;
- a pressure sensor positioned to measure a pressure in said filtering system; and
- a controller operatively coupled to said filter pressurizing means and said pressure sensor;
- wherein said controller is adapted, after said filtering system has been subjected to said cleaning procedure, to actuate said filter pressurizing means so as to establish a pressure over said filter, to monitor an output from said pressure sensor so as to determine a decay in the pressure over said filter during a predetermined time, and to estimate a qualitative result of said cleaning procedure by comparing the determined pressure decay to predefine reference data.

8. The apparatus according to claim 7, wherein said filtering system further includes a fluid container for feeding a fluid through said filter during said cleaning procedure and wherein said controller is adapted, upon completion of said cleaning procedure, to drain said fluid from said filter while leaving the pores thereof soaked with said fluid.

9. The apparatus according to claim 7 or 8, wherein said filter pressurizing means comprise a gas supplying device coupled to said filter and first and second valves positioned at an inlet side and an outlet side, respectively, of said filter, and wherein said controller is adapted to cause said gas supplying device to supply gas to said filter as well as to close said first and second valves so as to establish said pressure over said filter.

10. The apparatus according to claim 7 or 8, wherein said pressure sensor is positioned between said first and second valves.

11. The apparatus according to claim 7 or 8, wherein said filtering system is included in a system for producing sterilized milk.

12. The apparatus according to claim 7 or 8, wherein the qualitative result estimated by said controller indicates whether said cleaning procedure has been efficient.

13. The apparatus according to claim 7 or 8, wherein said controller is adapted, in case the estimated qualitative result indicates that said cleaning procedure has not been efficient, to initiate an additional cleaning procedure for said filtering system.

14. The apparatus according to claim 7 or 8, wherein the pressure established by said filter pressurizing means over said filter is about 1600 mbar, said predetermined time is about 120 seconds, and the pressure decay of said filter after having been subjected to an efficient cleaning procedure is defined by said predefined reference data as 50–60 mbar, whereas the pressure decay of said filter after having been subjected to a non-efficient cleaning procedure is defined by said predefined reference data as 10–30 mbar.

* * * * *